(12) United States Patent  
Okubo

(10) Patent No.: US 8,247,941 B2  
(45) Date of Patent: Aug. 21, 2012

(54) BRUSHLESS MOTOR WITH SKEW ANGLE SET FOR LOW TORQUE RIPPLE AND HIGH OUTPUT

(75) Inventor: Masayuki Okubo, Kiryu (JP)

(73) Assignee: Mitsuba Corporation, Gunma (JP)

( * ) Notice: Subject to any disclaimer, the term of this patent is extended or adjusted under 35 U.S.C. 154(b) by 94 days.

(21) Appl. No.: 12/811,852

(22) PCT Filed: Jan. 30, 2009

(86) PCT No.: PCT/JP2009/051545  
§ 371 (c)(1),  
(2), (4) Date: Jul. 20, 2010

(87) PCT Pub. No.: WO2009/099004  
PCT Pub. Date: Aug. 13, 2009

(65) Prior Publication Data  
US 2010/0283348 A1   Nov. 11, 2010

(30) Foreign Application Priority Data  
Feb. 7, 2008   (JP) .................................. 2008-027429

(51) Int. Cl.  
*H02K 21/12*   (2006.01)

(52) U.S. Cl. .......... 310/156.47; 310/156.37; 310/156.38

(58) Field of Classification Search .......... 310/157.36–157.38, 156.45, 156.47, 310/156.53  
See application file for complete search history.

(56) References Cited

U.S. PATENT DOCUMENTS

| | | | |
|---|---|---|---|
| 2004/0155547 A1* | 8/2004 | Islam et al. | 310/156.43 |
| 2008/0055032 A1* | 3/2008 | Miyata | 335/306 |

FOREIGN PATENT DOCUMENTS

| | | | |
|---|---|---|---|
| JP | 2004-274963 | | 9/2004 |
| JP | 2005-27422 | | 1/2005 |
| JP | 2005027422 A | * | 1/2005 |
| JP | 2006-174692 | | 6/2006 |

OTHER PUBLICATIONS

Machine Translation JP2005027422 (2005).*  
International Preliminary Report on Patentability issued Sep. 7, 2010 in International (PCT) Application No. PCT/JP2009/051545.  
International Search Report issued Apr. 21, 2009 in International (PCT) Application No. PCT/JP2009/051545.

* cited by examiner

*Primary Examiner* — Quyen Leung  
*Assistant Examiner* — Jose Gonzalez Quinones  
(74) *Attorney, Agent, or Firm* — Wenderoth, Lind & Ponack, L.L.P.

(57) ABSTRACT

A brushless motor has a 2P3S×n structure, in which a ratio (W) of a circumferential width (Wm) of each of magnets to a length (Wp) of a chord formed between endpoints of an arc with a center angle θp=360°/pole-number 3n, the arc being included in an inner-diameter circle C2 of each of the magnets, is in a range of 0.76<W=Wm/Wp<0.86. Therefore, in the brushless motor of the 2P3S×n structure, a skew angle may be set in a range of 36°≦θskew≦57° in terms of electrical angle, while a content ratio of a fifth harmonic component contained in an induced voltage of the brushless motor may be set in a range of 4.5% to 6.5% with respect to a fundamental wave.

4 Claims, 6 Drawing Sheets

[FIG. 1]
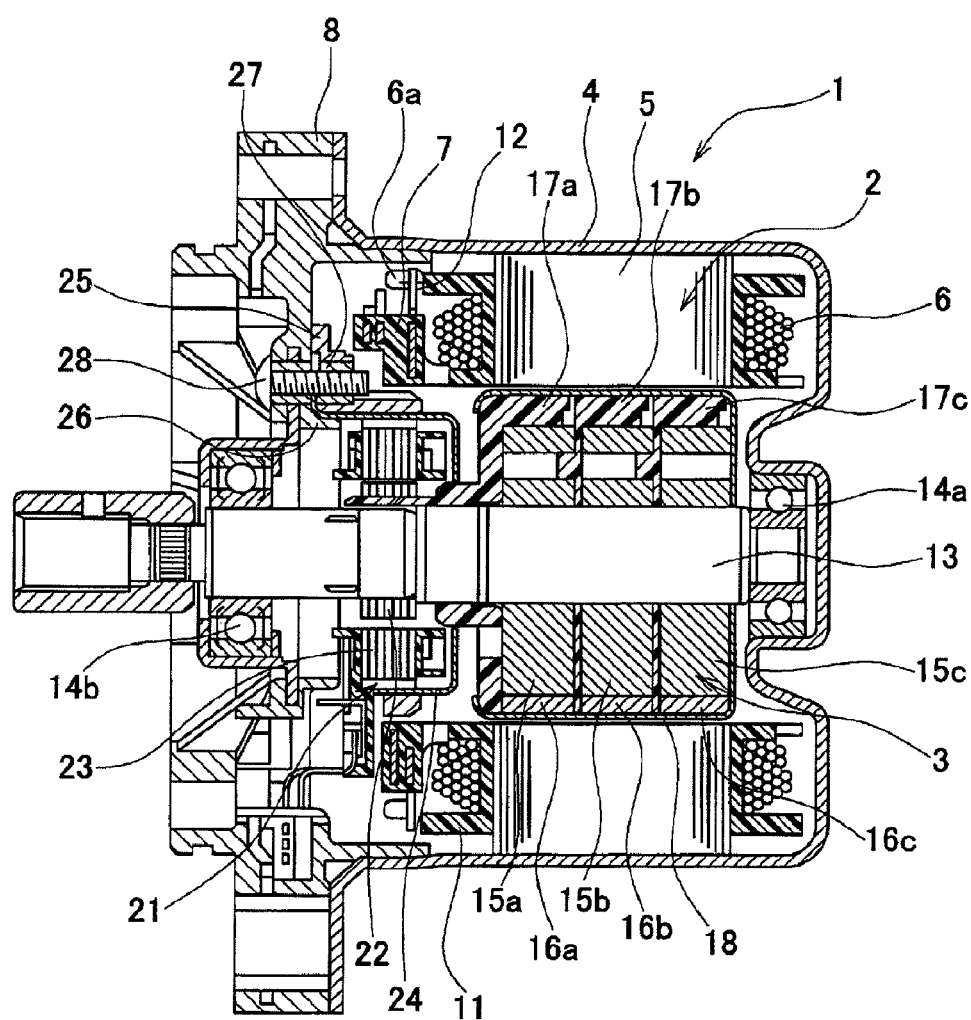

[FIG. 2]
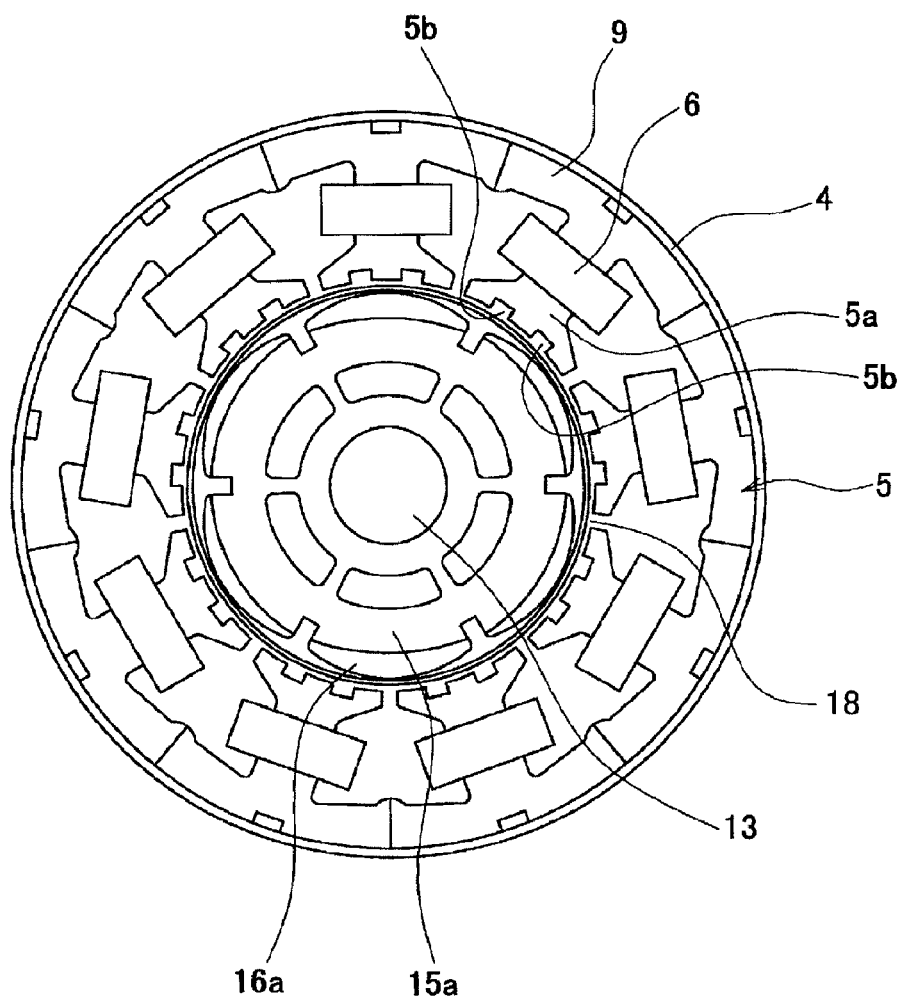

[FIG. 3]
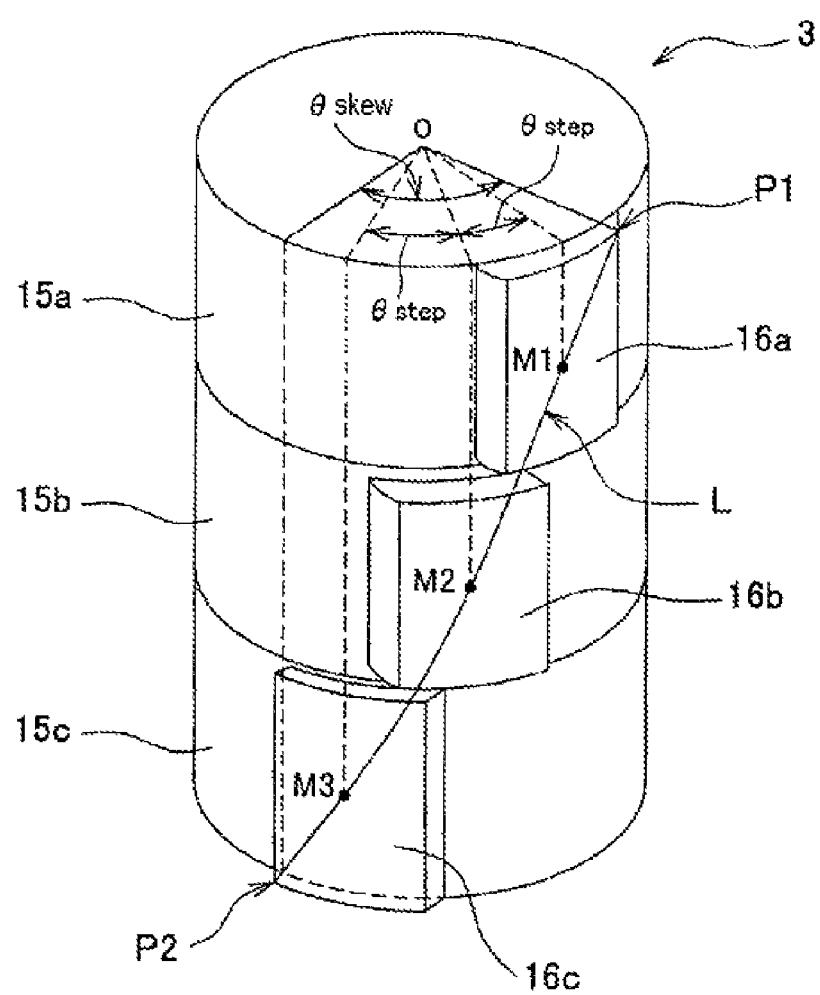

[FIG. 4]
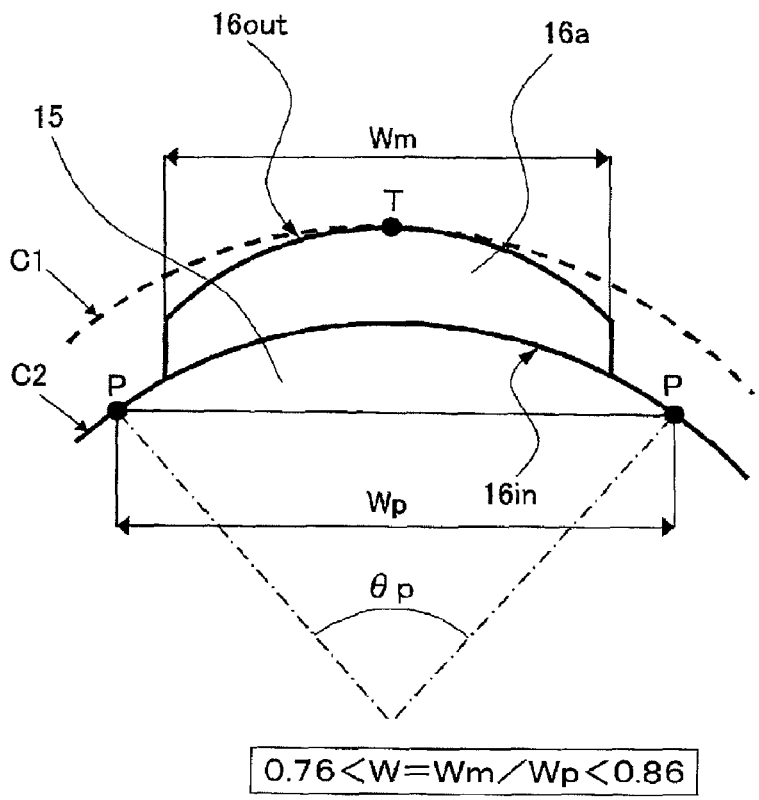
[FIG. 5]
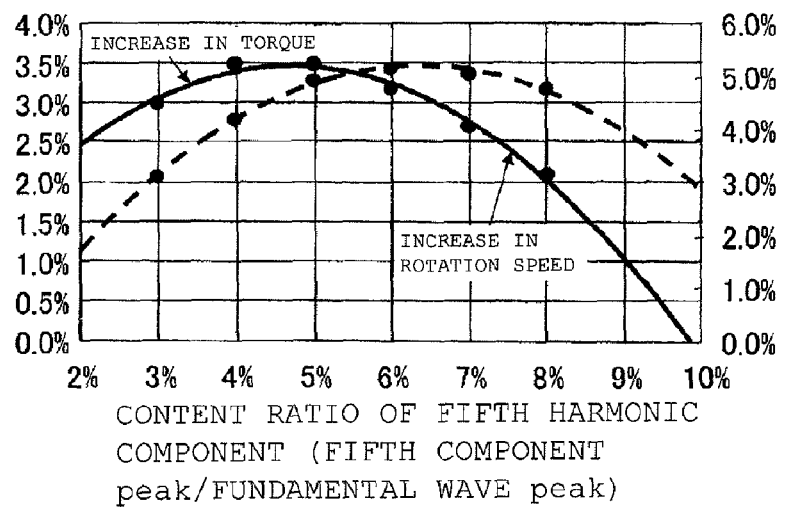

[FIG. 6]
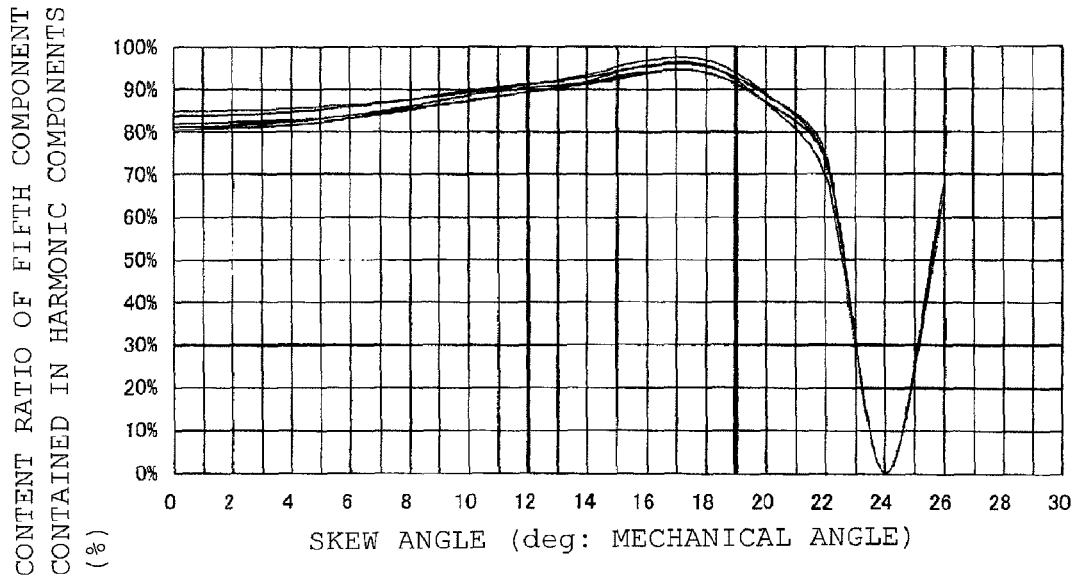
[FIG. 7]
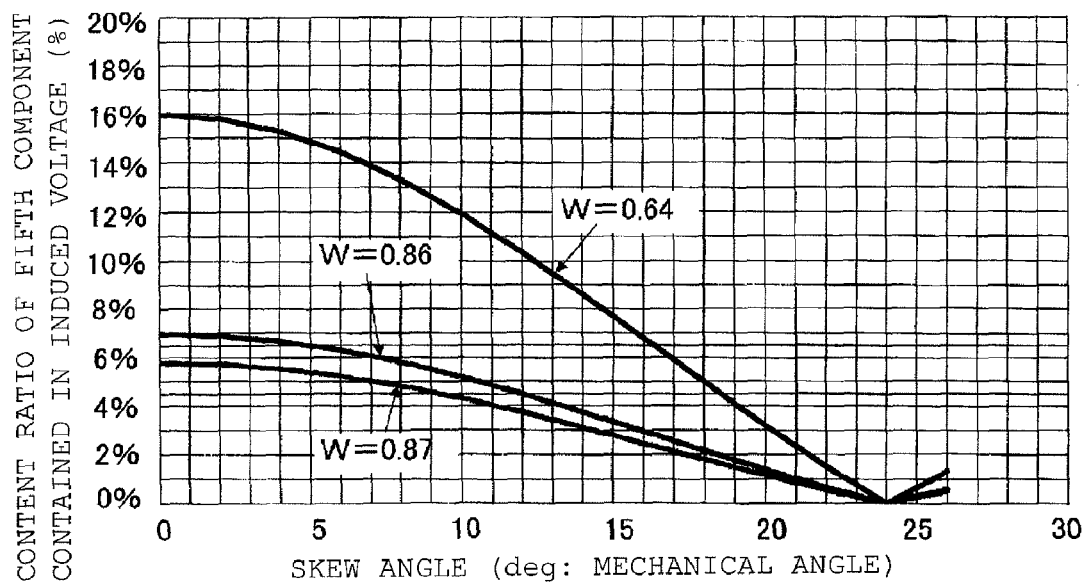

[FIG. 8]
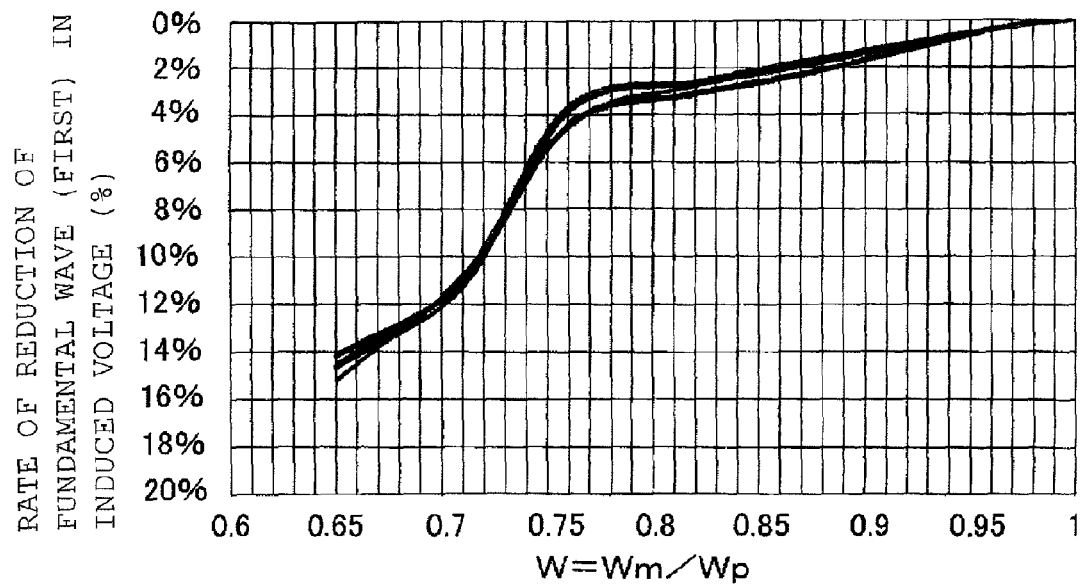
[FIG. 9]
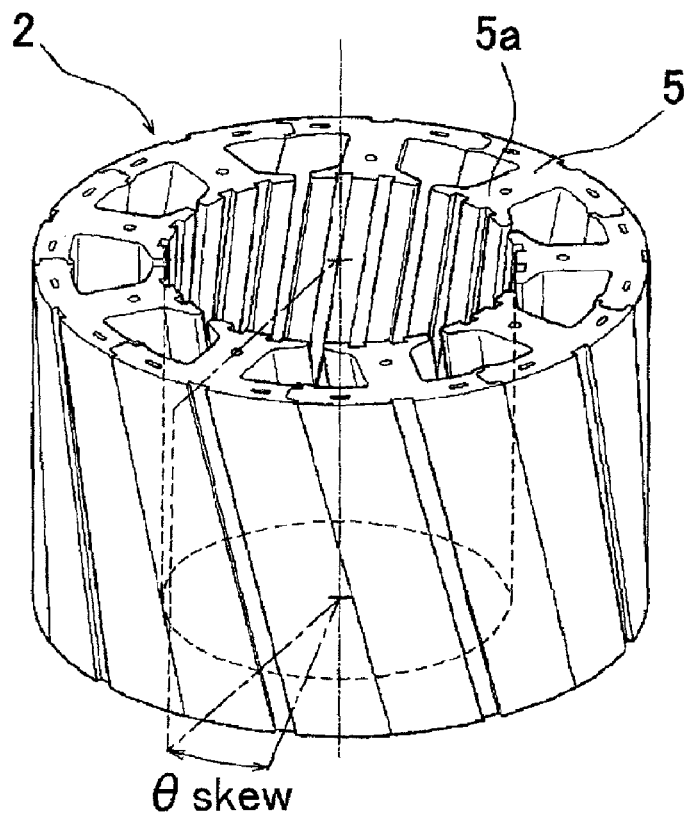

BRUSHLESS MOTOR WITH SKEW ANGLE SET FOR LOW TORQUE RIPPLE AND HIGH OUTPUT

TECHNICAL FIELD

The present invention relates to a brushless motor, in particular, a brushless motor having a low torque ripple and a high output, which is excellent in controllability.

BACKGROUND ART

Conventionally, for improving quietness of a brushless motor, a control method for smoothing switching of energization by sine-wave drive so as to reduce a torque ripple is known. In the sine-wave drive, a current having a current value changing in a sinusoidal waveform is supplied to a motor whose induced voltage has a sinusoidal waveform. As a result, the sine-wave driven motor has a small torque ripple as compared with a general 120-degree square-wave driven motor. Moreover, as a method of reducing the torque ripple, a skew structure for inclining rotor magnetic poles or the like with respect to an axial direction is widely known. In a motor using the skew structure, harmonic components of the induced voltage waveform are reduced. Thus, the induced voltage waveform may be changed into a smooth sinusoidal waveform. Accordingly, the effects of reducing the torque ripple at the time of the sine-wave drive are further improved.

In the motor having the skew structure, however, a fundamental component of the induced voltage is reduced with the reduction of the harmonic components if the skew angle is increased. The magnitude of a torque entirely depends on the fundamental component because the output torque of the motor is approximately equal to a product of the induced voltage and the motor current. Therefore, if the skew angle is increased to reduce the torque ripple, the motor torque is reduced to lower a voltage-use efficiency. On the other hand, if motor specifications are set with the small skew angle to suppress the reduction in induced voltage so as to ensure the motor torque, there is a problem in the increased torque ripple because the harmonic components are correspondingly increased.

Therefore, in recent years, for improving the voltage-use efficiency and reducing the torque ripple at the same time, a control method for causing the motor driving current to contain the harmonic components so as to cancel the harmonic components of the induced voltage has been proposed. According to the control method, the fundamental component is ensured with the small skew angle, while the induced voltage is changed into the sinusoidal waveform by the harmonic components of the motor-driving current. As a result, the increased output of the motor is realized while the torque ripple is reduced.

Patent document 1: JP 2006-174692 A

In the control method for causing the motor-driving current to contain the harmonic components as described above, however, it is necessary to set a control cycle according to the harmonic components. Therefore, in a control mode in which a large number of high-order harmonic components having a short wavelength are contained, there is a problem in that the control cycle is required to be set extremely short. As a result, the control is extremely difficult. In addition, there are problems in that a load is imposed on, and cost becomes high for, a control system correspondingly.

An object of the present invention is to provide a brushless motor realizing a low torque ripple and a high output at the same time, which may be easily controlled.

SUMMARY OF THE INVENTION

A brushless motor according to the present invention includes: a stator having 2n (n is a positive integer) slots; and a rotor having 3n magnetic poles, the brushless motor being rotatingly driven by a three-phase driving current, in which a content ratio of a fifth harmonic component contained in an induced voltage of the brushless motor with respect to a fundamental wave is in a range of 4.5% to 6.5%.

According to the present invention, in a 2P3S×n structure brushless motor, the content ratio of the fifth harmonic component contained in the induced voltage is set in the range of 4.5% to 6.5% with respect to the fundamental wave. As a result, a torque and a rotation speed are effectively increased for the sine-wave drive.

In the brushless motor, a skew angle of one of the rotor and the stator may be set in a range of $36° \leq \theta\text{skew} \leq 57°$ in terms of electrical angle, and a ratio W of a circumferential width Wm of each of magnets forming the magnetic poles to a length Wp of a chord formed between endpoints of an arc having a center angle $\theta p=360°/\text{pole-number } 3n$, the arc being included in an inner diameter circle of teach magnet, may be set in a range of $0.76<W=Wm/Wp<0.86$. As a result, in the 2P3S×n structure brushless motor, the content ratio of the fifth harmonic component contained in the induced voltage of the brushless motor may be set in the range of 4.5% to 6.5% with respect to the fundamental wave.

Moreover, the brushless motor may have a 6-pole 9-slot structure with a number of the magnetic poles being six (n=3) and a number of the slots being nine, and may be used as a drive source for electric power steering. In a case of the brushless motor according to the present invention, a low torque ripple and a high output are realized at the same time. In addition, control is easy. Therefore, the brushless motor according to the present invention is particularly useful as a motor for electric power steering, which has a severe requirement for a torque ripple and therefore is required to be reduced in size and have a higher output.

EFFECTS OF THE INVENTION

The brushless motor according to the present invention is a so-called 2P3S×n structure brushless motor, in which the content ratio of the fifth harmonic component contained in the induced voltage is set in the range of 4.5% to 6.5% with respect to the fundamental wave. As a result, a torque and a rotation speed may be effectively increased for the sine-wave drive.

Moreover, by setting the skew angle of the rotor in the range of: $36° \leq \theta\text{skew} \leq 57°$ in terms of electrical angle and setting the ratio W of the circumferential width Wm of each of the magnets forming the magnetic poles to the length Wp of the chord formed between endpoints of the arc with the center angle $\theta p=360°/\text{pole-number } 3n$, which is included in the inner-diameter circle of the magnet to: $0.76<W=Wm/Wp<0.86$, the content ratio of the fifth harmonic component contained in the induced voltage of the brushless motor may be set in the range of 4.5% to 6.5% with respect to the fundamental wave in the 2P3S×n structure brushless motor. As a result, the low torque ripple and the high output may be simultaneously realized. In addition, a control cycle may be made long as compared with conventional motors. Therefore, the drive control for the motor may be facilitated.

BRIEF DESCRIPTION OF THE DRAWINGS

FIG. 1 is a sectional view of a brushless motor which is an embodiment of the present invention.

FIG. 2 is an explanatory view illustrating a structure of a stator included in the motor illustrated in FIG. 1.

FIG. 3 is an explanatory view for a skew angle of a rotor.

FIG. 4 is an explanatory view illustrating a shape of a magnet included in the motor illustrated in FIG. 1.

FIG. 5 is a graph illustrating a relation between a content ratio of a fifth harmonic component contained in an induced voltage, and a rate of torque increase and a rate of rotation speed increase for sine-wave drive.

FIG. 6 is a graph illustrating a relation between a skew angle (in terms of mechanical angle) and the content ratio of the fifth harmonic component to all harmonic components, which is observed in a motor with six poles and nine slots.

FIG. 7 is a graph illustrating the result of research on a relation between the skew angle (in terms of mechanical angle) and the content ratio of the fifth harmonic component contained in the induced voltage, which is conducted using the magnet shape (the ratio W=Wm/Wp) as a parameter, which is observed in the motor with six poles and nine slots.

FIG. 8 is a graph illustrating a relation between the ratio W and a rate of reduction of a fundamental wave contained in the induced voltage, which is observed in the motor with six poles and nine slots.

FIG. 9 is an explanatory view illustrating a structure of the stator of the motor in which the stator is skewed.

| Description of Symbols | |
|---|---|
| 1: brushless motor | 2: stator |
| 3: rotor | 4: case |
| 5: stator core | 5a: teeth |
| 5b: groove | 6: coil |
| 6a: end part | 7: bus-bar unit |
| 8: bracket | 9: core segment |
| 11: insulator | 12: power supply terminal |
| 13: rotor shaft | 14a, 14b: bearing |
| 15a-15c: rotor core | 16a-16c: magnet |
| 16out: outer circumferential surface | |
| 16in: inner circumferential surface | |
| 17a-17c: magnet holder | 18: magnet cover |
| 21: resolver | 22: rotor (resolver rotor) |
| 23: stator (resolver rotor) | 24: resolver holder |
| 25: resolver bracket | 26: rib |
| 27: female screw | 28 holding screw |
| θskew: skew angle | θstep: step angle |
| M1-M3: center of magnet | L: line connecting centers of magnets |
| O: center of rotation of rotor | |
| P1, P2: intersection point of line L with rotor core end part | |
| C1: arc | C2: magnet inner diameter circle |
| T: outermost diameter position | W: ratio, |
| Wm: magnet width | |
| Wp: length of chord formed between endpoints of arc having center angle θp = 360°/pole-number in magnet inner diameter circle | |
| W: ratio of Wm to Wp (=Wm/Wp) | |

DETAILED DESCRIPTION OF THE INVENTION

Hereinafter, an embodiment of the present invention is described in detail, with reference to the accompanying drawings. FIG. 1 is a sectional view of a brushless motor according to an embodiment of the present invention. As illustrated in FIG. 1, a brushless motor 1 (hereinafter referred to as "motor 1") is an inner-rotor type that has a stator 2 arranged outside and a rotor 3 arranged inside. For example, the motor 1 may be used as a power source of an electric power-steering (EPS) apparatus of column-assist type. The motor 1 may apply an auxiliary drive force to a steering shaft of a vehicle. The motor 1 is secured to a speed-reducing mechanism, which is coupled to the steering shaft. The speed-reducing mechanism reduces the rotational speed of the motor 1 and transmits the rotation to the steering shaft.

The stator 2 includes a case 4 having a bottomed hollow cylinder shape, a stator core 5, stator coils 6 (hereinafter referred to as "coils 6") wound around the stator core 5, and a bus-bar unit (terminal unit) 7 attached to the stator core 5. The case 4 is a bottomed hollow cylinder made of iron or the like. The case 4 has openings. In the openings, brackets 8 made of die-cast aluminum are fitted. The brackets 8 are secured to the case 4 with fastening screws (not shown).

As illustrated in FIG. 2, the stator core 5 includes a plurality of core segments 9 (nine segments, in this embodiment) that are arranged in the circumferential direction. The stator core 5 has nine teeth 5a that project inside in the radial direction. The distal end of the stator core 5 has 2n grooves 5b (two grooves, in this embodiment). The grooves 5b are designed to reduce cogging torque resulting from pseudo slot effect. Each core segment 9 is produced by stacking core pieces made of electromagnetic steel plates. An insulator 11 made of synthetic resin surrounds the core segments 9.

The coils 6 are wound around the insulator 11. One end part 6a of each coil 6 is led at one end of the stator core 5. The bus-bar unit 7 is secured to the one end of the stator core 5. Bus bars made of copper are inserted in the casing of the bus-bar unit 7 that is made of synthetic resin. From the circumferential surface of the bus-bar unit 7, a plurality of power supply terminals 12 protrude in the radial direction. The end part 6a of each coil is welded to the power supply terminals 12 at the time of fastening the bus-bar unit 7. The bus-bar unit 7 has as many bus bars as the number of phases of the motor 1 (in this embodiment, three bus bars are provided for U, V, and W phases, respectively). Each coil 6 is electrically connected to the power supply terminal 12 for the associated phase. The stator core 5 is press-fitted and fixed in a case 4 after the bus-bar unit 7 has been fastened.

The rotor 3 is inserted in the stator 2. The rotor 3 has a rotor shaft 13. The rotor shaft 13 may freely rotate, supported by bearings 14a and 14b. The bearings 14a and 14b are fastened to the center part of the bottom of the case 4 and the center part of the bracket 8, respectively. On the rotor shaft 13, hollow cylindrical rotor cores 15a to 15c are secured. To the outer circumferential surfaces of the rotor cores 15a to 15c, segment-type magnets (permanent magnets) 16a to 16c are fastened. In the motor 1, the magnets 16a to 16c are arranged in six rows and three columns along the circumferential direction. That is, the motor 1 has a six-pole, nine-slot structure (hereinafter referred to as "6P9S"). A magnet cover 18, which is a bottomed hollow cylinder, is provided, surrounding the magnets 16a to 16c.

Each of the magnets 16a to 16c of the motor 1 is formed in a shape so that an outer circumferential surface 16out is eccentric with respect to an inner circumferential surface 16in. Specifically, a center of the outer circumferential surface 16out of the magnet is not concentric with an arc C1 passing through an outermost diameter position T of the outer circumferential surface 16out. The outer circumferential surface 16out is a circumferential surface having a radius smaller than that of the inner circumferential surface 16in. By forming the outer circumferential surface 16out of the magnet eccentrically as described above, a cogging may be reduced.

Magnet holders 17a to 17c made of synthetic resin are secured to the outer sides of the magnets 16a to 16c. The magnets 16a to 16c are attached to the outer circumferences of the rotor cores 15a to 15c, being held by the magnet holders 17a to 17c. In the motor 1, the magnets 16a to 16c are arranged in three columns in the axial direction, while held by the magnet holders 17a to 17c. The magnets 16a to 16c of each column are displaced in the circumferential direction by a predetermined step angle θstep. Thus, the rotor 3 of the motor 1 has a skew structure, in which the three magnets 16a to 16c are stacked one on another.

FIG. 3 is a diagram describing the skew angle of the rotor 3. As illustrated in FIG. 3, in the step-skew structure, the line L connecting the centers M1 to M3 of the magnets 16a to 16c (in both the circumferential direction and the axial direction) intersects with the end parts of the magnets 16a and 16c at points P1 and P2, respectively. The center angle to the center O of rotation between the points P1 and P2 is the magnet skew angle θskew. Hence, the step angle θstep between the magnets 16a and 16b is a center angle between the points M1 and M2 to the center O of rotation, and the step angle θstep between the magnets 16b and 16c is a center angle between the points M2 and M3 to the center O of rotation. Moreover, the center angles between the points M1 and P1, and M3 and P2 are half the step angle θstep (θstep/2), respectively. Therefore, the skew angle θskew is θstep×(number of magnets stacked−1)+(θstep/2)×2=θstep×number of magnets stacked.

A rotor (resolver rotor) 22 of a resolver 21 used as means for detecting a rotation angle is attached to the end of the magnet holder 17a. By contrast, a stator (resolver stator) 23 of the resolver 21 is pressed into a resolver holder 24 made of metal and held in a resolver bracket 25 made of synthetic resin. The resolver holder 24 is a bottomed hollow cylinder. The resolver holder 24 is press-fitted lightly on the end part outer circumferential surface of a rib 26, which is provided on the center part of the bracket 8. A female screw 27 made of metal is inserted in the resolver bracket 25 and the bracket 8. A holding screw 28 is screwed in the female screw 27 from outside the bracket 8. The resolver holder 24 is thereby secured in the bracket 8.

Here, an induced voltage of the motor having a structure with an integer multiple of 2P3S (the motor 1 has 2P3S×3=6P9S) contains harmonic components of an odd-numbered order equal to or larger than fifth order. Among all the odd-numbered order harmonic components contained therein, the number of fifth components is the largest. In a case of 2P3S×n, a third harmonic component is not generated because a short-pitch factor $Kp = \cos\{n \cdot (1-\beta) \cdot \pi/2\} = 0$ (where n is an order, and β is coil pitch/pole pitch; in a case of 2P3S, β=2/3, and when n=3, cos is zero). When only the fifth harmonic component is contained in a fundamental wave, a line induced voltage has approximately a trapezoidal waveform. At this time, if the motor-driving current is made to have a trapezoidal waveform, the torque ripple may be made closer to zero. In addition, a peak current value of the trapezoidal-wave current may be reduced because a crest value of the trapezoidal-wave current may be lowered as compared with that of a sine-wave current. On the other hand, in a case of the same peak current value, a larger amount of current may be made to flow with the trapezoidal wave than with the sine wave. Thus, by adjusting the induced voltage to contain: the fundamental wave+the fifth harmonic component, the motor output may be increased while the torque ripple is reduced.

On the other hand, the motor 1 has the skew structure as described above. In order to realize both the improvement of the voltage-use efficiency and the reduction of the torque ripple, the motor-driving current containing the harmonic component is supplied even to the motor 1. As described above, however, if a large number of high-order harmonic components are contained, the control cycle becomes extremely short to make the control difficult to perform. Thus, the inventors of the present invention focus attention on the above-mentioned characteristics of the 2P3S×n-structure motor and examine a configuration for limiting the harmonic-components to the fifth component as much as possible and reducing the components of the other orders. Then, as a result of various experiments, the following conclusions are obtained.

(1) When the content ratio of the fifth harmonic component contained in the induced voltage with respect to the fundamental wave is set in the range of 4.5% to 6.5%, a torque and a rotation speed effectively increase for the sine-wave drive.

(2) When the skew angle is set: $36° \leq \theta\text{skew} \leq 57°$ in electrical angle, the content ratio of the fifth harmonic component to all the harmonic components becomes large (90%). The range: $36° \leq \theta\text{skew} \leq 57°$ in terms of electrical angle corresponds to the range: $12° \leq \theta\text{skew} \leq 19°$ in terms of mechanical angle in the 6P9S motor. Moreover, when the magnets are to be stacked, the step angle in each stage is obtained by dividing the above-mentioned value by the number of stacked magnets (electrical angle 36°/number of stacked magnets $\leq \theta\text{step} \leq 57°$/number of stacked magnets).

(3) Assuming a shape of each of the magnets 16a to 16c is set to satisfy: $0.76 < W = Wm/Wp < 0.86$, the content ratio of the fifth harmonic component is in the range of 4.5% to 6.5% (Wm: a magnet width, Wp: a length of a chord P-P (see FIG. 4), specifically, a length of a chord formed between endpoints of an arc having a center angle $\theta p = 360°$/pole-number (60° in a case of six poles), which is included in a magnet inner diameter circle C2). Although the magnet 16a is illustrated in FIG. 4, each of the other magnets 16b and 16c has a similar structure.

Hereinafter, each of the above-mentioned (1) to (3) is described based on the results of experiments. First, regarding (1), FIG. 5 is a graph illustrating the relation between the content ratio of the fifth harmonic component and the rate of torque increase and the rate of rotation speed increase with respect to the sine-wave drive. As illustrated in FIG. 5, as the fifth harmonic component increases, the torque and the rotation speed become larger. Nonetheless, when the torque and the rotation speed exceed particular values, the rates at which they increase start lowering. Moreover, the torque increase rate and the rotation speed increase rate are different from each other, and hence the former attains a maximum increase of about 5%, and the latter a maximum increase of about 6.5%. The inventors therefore regard the ranges in which both increase rates may be secured at 3% or more, as being effective. The inventors of the represent invention accordingly determine that the content of fifth harmonic component should best be 4.5% to 6.5% as described in (1).

Next, regarding (2), FIG. 6 is a graph illustrating the relation between the skew angle (mechanical angle) and the content ratio of the fifth harmonic component to all harmonic components, which is observed in a 6P9S-structure motor. As FIG. 6 illustrates, as the skew angle becomes larger, the content of the fifth harmonic component becomes larger. When the skew angle exceeds 18°, however, the content of the fifth harmonic component starts decreasing. When the skew angle exceeds 22°, the content of the fifth harmonic component sharply decreases. Assume that effective range of the content of the fifth harmonic component is 90% or more, as described in (2), the skew angle θskew (mechanical angle) should be: 12°≦θskew (mechanical angle)≦19° in 6P9S structure. Namely, in the motor of 2P3S×n structure, the inventors of the present invention determine that the skew angle (electrical angle) θskew is preferred to be 36°≦θskew (electrical angle)≦57°. FIG. 6 illustrates the results of the research on motors that differ in magnet width and eccentricity of the inner and outer diameters. The relation between the skew angle and the ratio of the fifth harmonic component is similar for magnets of various configurations.

Further, regarding (3), FIG. 7 is a graph illustrating the result of research on a relation between the skew angle (in terms of mechanical angle) and the content ratio of the fifth harmonic component contained in the induced voltage, in the 6P9S motor, which is conducted using the magnet shape (the ratio W=Wm/Wp) as a parameter. As illustrated in FIG. 7, as the ratio W decreases, the content ratio of the fifth harmonic component increases. By setting W<0.86, the content ratio of the fifth harmonic component may be set to 4.5% while the skew angle (mechanical angle) is in the range: 12°≦θskew (mechanical angle)≦19°. This result may be obtained not only with the 6P9S-structure motor but also in the other 2P3S×n motors when the skew angle (electrical angle) is set in the range of: 36°≦θskew (electrical angle)≦57°.

On the other hand, FIG. 8 is a graph illustrating a relation between the ratio W and a reduction rate of the fundamental wave in the induced voltage, which is observed in the 6P9S motor. As illustrated in FIG. 7, when the ratio W becomes equal to 0.76, the fundamental wave in the induced voltage is suddenly reduced to remarkably lower the output torque of the motor. Therefore, for the ratio W, the conclusion that 0.76<W=Wm/Wp<0.86 is preferred as described in (3) is obtained from the results illustrated in FIGS. 7 and 8. In the motor 1 according to the present invention, each of the magnets 16a to 16c is formed so as to satisfy the relation: 0.76<W=Wm/Wp<0.86. As a result, the motor 1 is a brushless motor satisfying the above-mentioned conditions (1) and (2).

The process leading to the present invention is summarized as follows. Specifically, in the 2p3s×n brushless motor adopting the skew structure, the skew angle is first reduced to suppress the reduction of the fundamental component so as to ensure the torque. When the skew angle becomes small, the content ratio of the harmonic component contained in the induced voltage becomes high. If the sine-wave drive is performed in this state, the torque ripple becomes disadvantageously large. Therefore, the harmonic component is superimposed on the motor-driving current to cancel the harmonic component contained in the induced voltage so as to reduce the torque ripple. However, when the high-order harmonic components are contained, controllability is degraded. Thus, the harmonic component to be contained in the induced voltage is limited to the fifth component which makes the induced voltage have the trapezoidal waveform and therefore is effective to improve the output and reduce the torque ripple.

After limiting the harmonic component to be superimposed on the motor-driving current to the fifth harmonic component, the content ratio of the fifth harmonic component is set within the range which allows the torque and the rotation speed to be increased. The value of the content ratio is (1) 4.5% to 6.5%. Moreover, the skew angle is set so that the content ratio of the fifth harmonic component to all the harmonic components becomes large. The value of the skew angle is (2) 36°≦θskew≦57° in terms of electrical angle. On the other hand, various experiments conducted by the inventors of the present invention make clear that the relation between the skew angle and the content ratio of the fifth harmonic component contained in the induced voltage changes depending on the magnet shape. It is found that the conditions (1) and (2) are satisfied when the ratio W is less than 0.86. Moreover, it is found that the fundamental wave contained in the induced voltage is suddenly reduced to remarkably lower the output torque of the motor when the ratio W becomes equal to or less than 0.76. As a result, the condition (3) is obtained.

As described above, in the brushless motor according to the present invention, the motor-driving current containing the harmonic component is supplied. In this manner, the motor output may be improved while the voltage-use efficiency is improved and the torque ripple is reduced. Thus, the efficient brushless motor may be provided. Moreover, it is not necessary to set the control cycle extremely short as in a case where a large number of the high-order harmonic components are contained because the harmonic component is limited to the fifth component. Thus, the drive control for the motor is facilitated. Further, a load on the control system is reduced. As a result, cost of a control circuit or the like is also reduced.

The present invention is not limited to the embodiment described above. Of course, various changes and modifications may be made within the scope and spirit of the invention.

For example, the present invention is applicable to a brushless motor of any other type for use in EPS's, though the embodiment described above is one designed for use in EPS's of column-assist type. In addition, the present invention is not limited to motors for use in EPS's and various in-vehicle electric devices. Rather, the present invention may be applied to brushless motors of various types. The embodiment described above is a 6-pole, 9-slot of the motor brushless motor having six magnets. Nevertheless, neither the number of magnets nor the number of slots of the motor is limited. The present invention is widely applicable to a brushless motor having a structure with an integer multiple of 2P3S.

Further, the present invention is applicable not only to the motor in which the rotor 3 is skewed but to a motor in which the stator 2 is skewed. According to the experiments conducted by the inventors of the present invention, even in the motor in which the stator 2 is skewed as illustrated in FIG. 9, the relations similar to those illustrated in FIGS. 6 and 7 are obtained. Specifically, when the skew angle is in the range of: 36°≦θskew≦57° in terms of electrical angle, the content ratio of the fifth harmonic component contained in all the harmonic components becomes large. When the ratio W is less than 0.86, the conditions (1) and (2) are satisfied. When the ratio W becomes equal to or smaller than 0.76, the fundamental wave contained in the induced voltage is suddenly reduced.

The invention claimed is:

1. A brushless motor, comprising:
   a rotor having 2n magnetic poles, wherein n is a positive integer; and
   a stator having 3n slots,
   wherein a skew angle of one of the rotor and the stator is in a range of 36°≦θskew≦57° in terms of electrical angle so that a content ratio of a fifth harmonic component contained in an induced voltage of the brushless motor with respect to all harmonic components is at least 90%, and so that a line induced voltage has approximately a trapezoidal waveform; and
   wherein a content ratio of the fifth harmonic component with respect to a fundamental wave is in a range of 4.5% to 6.5%.

2. A brushless motor according to claim 1, wherein:

a ratio W of a circumferential width Wm of each of a plurality of magnets forming the magnetic poles to a length Wp of a chord formed between endpoints of an arc having a center angle $\theta p=360°/$pole-number $3n$, the arc being included in an inner diameter circle of each of the magnets, is in a range of $0.76<W=Wm/Wp<0.86$.

3. A brushless motor according to claim 1, wherein the rotor and the stator have a 6-pole 9-slot structure with a number of the magnetic poles being six ($n=3$) and a number of the slots being nine.

4. A brushless motor according to claim 1, wherein the brushless motor is a drive source for electric power steering.

* * * * *